Aug. 19, 1930.   R. HERRMANN   1,773,677
MACHINE FOR THE PRODUCTION OF THE FACES OF TEETH OF GEAR WHEELS
Filed Sept. 13, 1926   3 Sheets-Sheet 1

Inventor
R. Herrmann
By Langner, Parry, Card & Langner
Att'ys.

Aug. 19, 1930.  R. HERRMANN  1,773,677
MACHINE FOR THE PRODUCTION OF THE FACES OF TEETH OF GEAR WHEELS
Filed Sept. 13, 1926   3 Sheets-Sheet 2

Inventor
R. Herrmann
By Langner, Parry, Card & Langner
Att'ys.

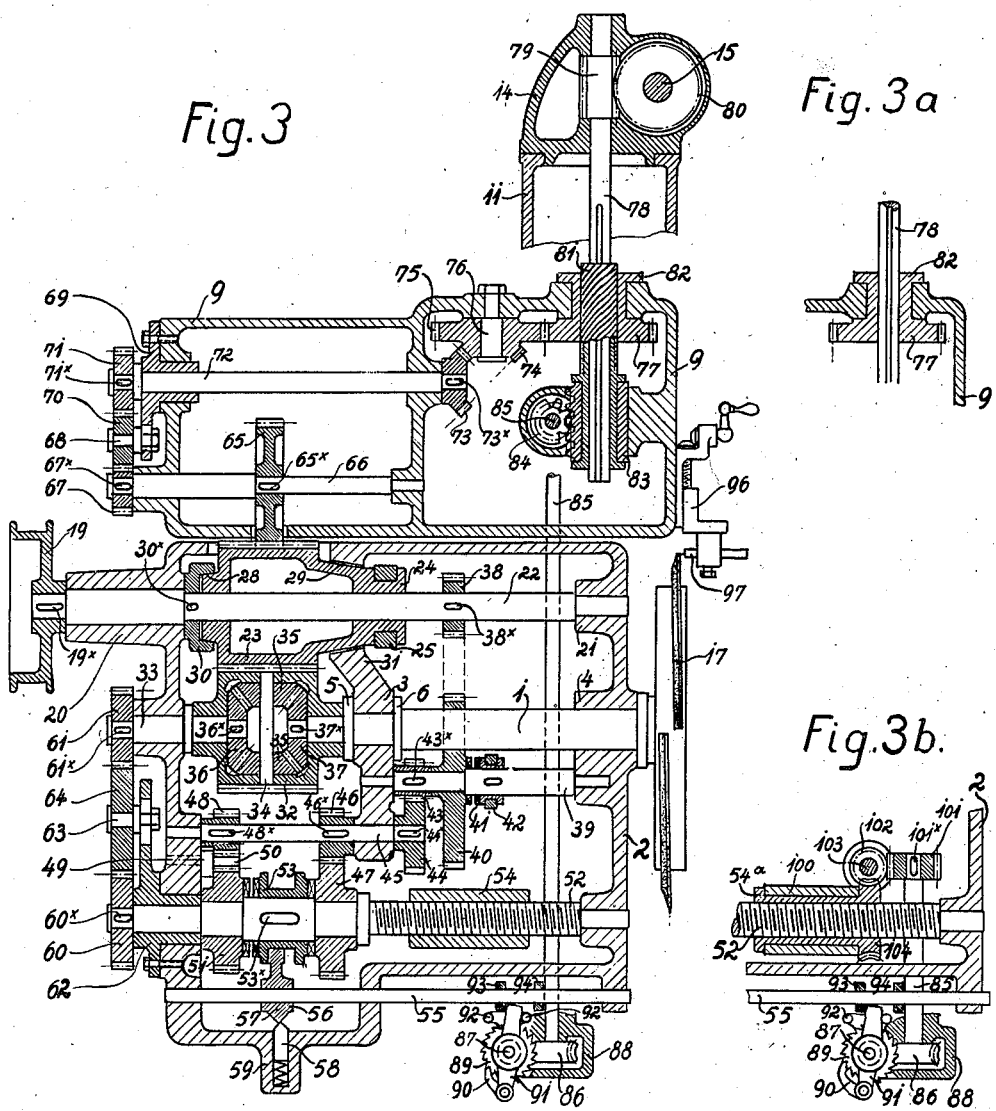

Patented Aug. 19, 1930

1,773,677

UNITED STATES PATENT OFFICE

RICHARD HERRMANN, OF FRANKFORT-ON-THE-MAIN, GERMANY

MACHINE FOR THE PRODUCTION OF THE FACES OF TEETH OF GEAR WHEELS

Application filed September 13, 1926, Serial No. 135,208, and in Germany September 18, 1925.

This invention relates to a machine for the mathematically accurate grinding of the faces of the teeth of gear wheels.

In the machine according to the invention the inconveniences of the commonly used machines, specially of those machines which work with grinding wheels, are avoided by effecting the grinding in a continuous operation, the blanks being permanently in contact with the tool, for instance with the grinding wheel, the working path of which has the shape of a cylindrical helical line the pitch of which is equal to that of the involute base circle. This working path in the shape of a helical line, for instance the grinding zone, is adjusted with regard to the gear in such a manner that it touches the pitch circle cylinder of the gear, the axis of which is inclined at an angle equal to the pitch angle of the helical working path. If the gear and the grinding spiral rotate at the ratio of the number of teeth, the grinding spiral produces in the plane of the wheel involute curves.

In the drawings the improved machine is shown, by way of example, in one form of construction.

Fig. 3 shows in cross section the transmission elements of the machine.

Fig. 3ª is a detail in longitudinal section showing the spline mounting of the shaft 78 and Fig. 3ᵇ is a detail in section showing the operative connections of the shaft 85.

Figure 4:
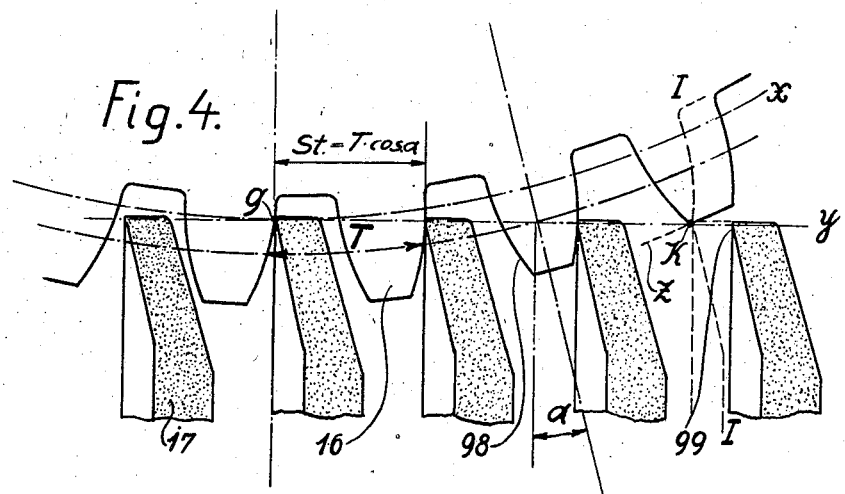

Fig. 4 illustrates in a diagrammatical view the working method.

Figure 2:
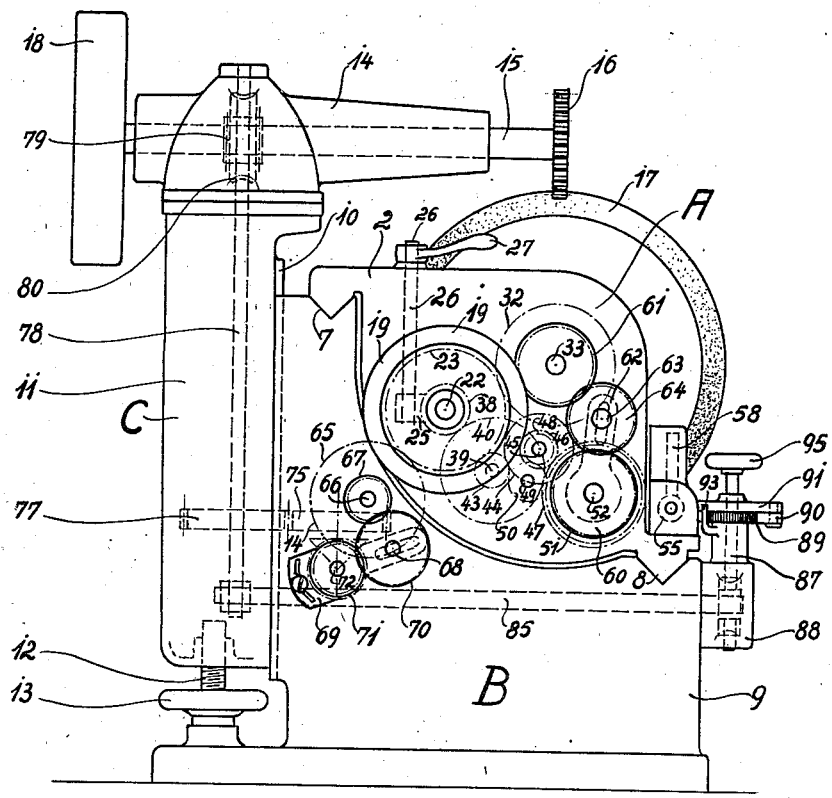
Fig. 2 is a side elevation of the machine.

The machine consists of a bed B, a carriage A mounted horizontally upon the bed so that it can be shifted in horizontal direction between guide-bars 7, 8, said carriage carrying the tool mounted on a shaft 1 and consisting of a grinding wheel 17, and an upright C which is shiftable on the bed in vertical direction and carries the work, mounted on a shaft 15 journalled in an adjustable arm 14. The work consists for instance of a gear wheel 16 with which the tool 17 engages (Fig. 2).

Figure 1:
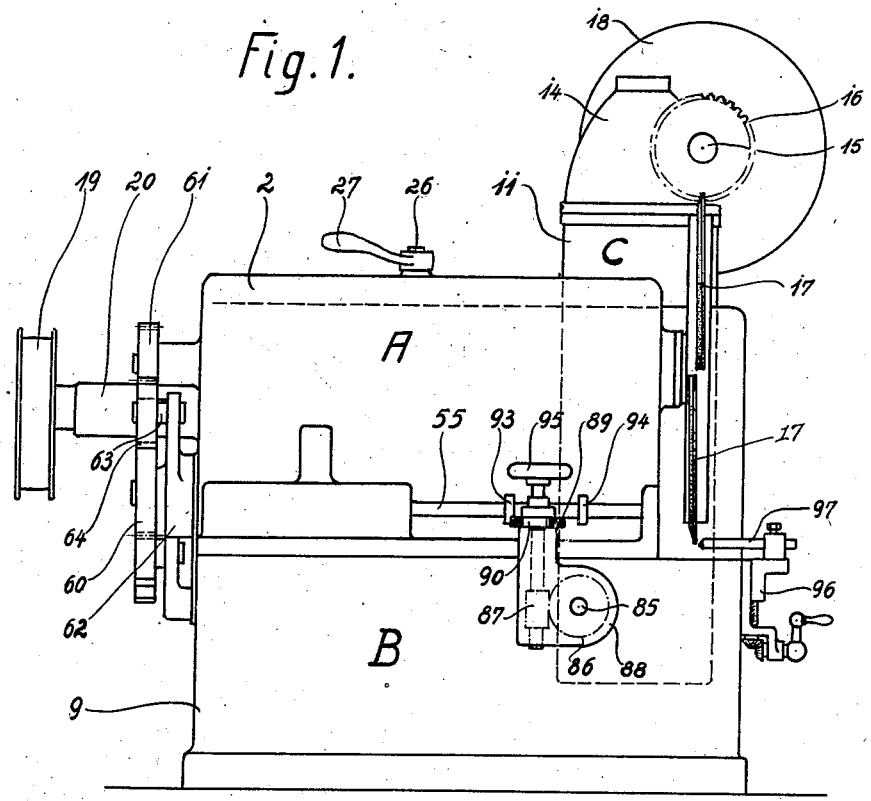
Fig. 1 shows a front elevation of the machine.

The shaft or spindle 1 which carries the tool, for instance a worm-shaped grinding wheel 17 situated outside the end wall 2 of the carriage A, is journalled in bearings 3, 4, and secured against shifting in longitudinal directions by pressure disks 5 and 6 situated in front of and behind the bearing 3. In the carriage A, a shaft 22 parallel to spindle 1 is journalled in bearings 20 and 21. This shaft 22 carries on the outer side of the carriage a driving pulley 19 fixed by means of a key 19ˣ and further, inside the carriage, a toothed drum 23 having conical ends 28 and 29. With a groove of the hub 24 of said drum a coupling fork 25 engages which is mounted on the inner end of a shaft 26 which is vertically mounted in the carriage A and has a handle 27 on its outer end. (Figs. 1 and 2.) By means of clutch cones 28 and 29 the toothed drum can be brought into engagement either with the clutch cone 30 keyed on shaft 22 by means of a key 30ˣ or, if it is shifted in the opposite direction, with a clutch 31 fixed on the carriage A. The teeth of drum 23 drive a spur wheel 32 one hub of which rotates loosely on the rear journal of the tool spindle 1, the other hub of said spur wheel rotating loosely on a spindle 33 journalled in the carriage in alignment with the spindle 1. In the hollow space of the spur wheel 32, two differential wheels 35 rotate on a shaft 34 which intersects the axles of the shafts 1 and 33, said differential wheels rolling upon a bevel wheel 36 which stands still or rotates only slowly and is keyed by means of a key 36ˣ on the inner end of the shaft 33, and which drive, the bevel wheel 37 with which they engage and which is keyed on the inner end of the grinding spindle 1 by means of a key 37ˣ, at double the speed of the spur wheel 32 when the wheel 36 is stopped. At the side of the toothed drum 23 a spur wheel 38 is arranged which is mounted on the driving shaft 22 by means of a key 38ˣ and which meshes with the toothed wheel 40 which is loosely mounted on the counter shaft 39. On the counter shaft 39 a clutch 41 is mounted, adapted to be shifted by means of a fork 42 and designed to couple the toothed wheel 40 with the shaft 39, said shaft driving then, through the intermediary of a toothed wheel 43 keyed on it by means of a key 43ˣ and of a weel 44 a shaft 45 on which said gear wheel 44 is mounted. On this shaft 45 two gear wheels 46 and 48 are keyed by means of keys 46ˣ and 48ˣ. The gear wheel 46 meshes directly with a gear wheel 47. The other gear wheel 48 drives a gear wheel 51 through the intermediary of an intermediate wheel 50 loosely mounted on a bolt 49. The two wheels 47 and 51 are loosely mounted on a screw spindle 52, on which they rotate in opposite directions and with which they are alternately coupled by means of a sleeve 53 mounted between the same and guided on a slide key 53ˣ. The screw spindle 52 journalled in the end walls 2 of the carriage A is screwed through a nut 53 fixed on the bed B and it effects a reciprocating shifting movement of the carriage A. The reversing of this movement is effected by means of a rod 55, which carries the clutch fork 56. This clutch fork 56 has a prismatic back 57 opposite a bolt 58. A spring 59 under this bolt pushes the bolt against the one or other inclined face of the back 57 whereby the rod 55 is suddenly pushed to the left or to the right as soon as it has been shifted beyond the central position. The shaft 33, which may be called the differential shaft, is driven from the screw spindle 52 from the differential change wheels 60 and 61 through the intermediary of an intermediate wheel 64 rotating on a bolt 63 of an adjustment plate 62. In this manner at the reciprocating movement of the carriage A an advancing or retarding additional rotation is communicated to the grinding spindle 1 said additional rotation corresponding to the pitch and direction of thread of the grinding path.

The toothed drum 23 drives further a spur wheel 65, loosely mounted on a shaft 66 journalled in the bed B, said shaft carrying on its outer end a part change wheel 67 fixed by means of a key 67ˣ. The change wheel 67 rotates, through the intermediary of an intermediate wheel 70 mounted on the bolt 68 of an adjustment plate 69, a part change wheel 71 keyed by means of a key 71ˣ on the extreme end of a shaft 72. The shaft 72 is journalled in the bed B and carries on its other end a bevel wheel 73 fixed by means of a key 72ˣ. This bevel wheel 73 drives a bevel wheel 74 mounted on a bolt 76 and a spur wheel 75 rigid with said bevel wheel 74. The spur wheel 75 meshes with a spur wheel 77 mounted on a vertical shaft 78 (Fig. 2). The shaft 78 is journalled in the upright C and rotates, through the intermediary of a worm 79 and of a worm wheel 80 in the head of the upright C, the work carrying spindle 15 on which said worm wheel is keyed. In order to communicate to the spindle 15 as well as to the grinding spindle 1 an additional rotating movement for the application of the tooth face against the grinding wheel, the vertical shaft 78 is rotated by a sleeve 81 which has on its outer circumference a square thread by means of which it is guided in the threaded bore of a hub 82 of the spur wheel 77. Owing to this guiding the sleeve 81 is rotated in the hub 82 of the spur wheel 77 when it is being displaced in axial direction. The axial shifting of sleeve 81 is effected by a sleeve 83 rotatable around sleeve 81 and having teeth with which a pinion 84 meshes. The pinion 84 is mounted on the end of a horizontal shaft 85, on the other end of which a worm wheel 86 is keyed. With this worm wheel 86 gears a worm shaft 87 which, together with the worm wheel 86, is inclosed in a casing 88. On the worm shaft 87 a ratchet wheel 89 is keyed with which engages a pawl 90 hingedly fixed to the end of the one arm of a two-armed lever 91 pivotably mounted on said shaft 87. The other arm of lever 91, the oscillating movement of which is limited by two stops 92, projects between rings 93, 94 which are adjustably mounted on the reversing rod 55 and against which said arm of lever 91 strikes alternately at every shifting movement of the carriage A. At this occasion the lever 91 is oscillated until it bears against one of the stops 92. This lever 91 acts then as a rigid element and shifts only the rod 55 so that this rod reverses the shifting movement of the carriage. At the reversing of the lever 91 a part rotation is communicated to the ratchet wheel 89 by means of the pawl 90 whereby the face of the tooth is applied against the grinding wheel. A hand wheel 95 (Figs. 1 and 2) at the upper end of shaft 87 permits of adjusting by hand.

In the hub of the cylindrical part 11 of the upright C a screw spindle 12, carrying a hand wheel 13, is guided, by means of which the upright can be lifted and lowered, said upright being guided by means of a rib 10 in a groove of the bed B. On the other side of the bed a carrier 96 is mounted which carries a turning tool for the grinding wheel 17, for instance a turning diamond 97. The production of the tooth faces is diagrammatically illustrated in Fig. 4.

The rim of the grinding wheel 17 is turned so that its side face, facing the tooth face 98 to be ground, forms an extremely narrow, practically line-shape grinding zone 99, the remaining portion of the rim of the grinding wheel being of such a shape that it does not touch the faces 98 of the teeth at any point. The grinding zone 99 is situated in the tangent to the involute base circle X. The pitch of the grinding spiral is equal to the division of the base circle, i.e. standard division multiplied by the cosinus of the angle of engagement (T cos α). The grinding wheel touches the teeth faces along the tangent Y, on the base circle X, i. e. along the engagement line, whereby an accurate involute is produced on the tooth faces by the grinding zone 99. The grinding wheel acts upon the entire length $g$ to $k$, the contact ceasing when the grinding zone 99 moves beyond the addendum circle. This extreme position is indicated in Fig. 4, by the dash line I—I.

For grinding a gear the upright C and with the same the gear to be ground is adjusted to such a height, that the grinding zone 99 coincides with the tangent on the base circle Y and the tool spindle 15 is oscillated into the pitch angle of the spiral shaped grinding zone. The part change wheels 67, 70 and 71 are exchanged in accordance with the number of teeth of the gear. The differential change wheels 60, 61 and 64 are selected so that the grinding spindle is rotated once from the screw spindle 52 through the intermediary of the change wheels 60, 61 and 64 and of the differential wheels 35, 36 and 37, when the carriage A is shifted by the screw spindle 52 the length of one base circle division.

If by coupling the spur wheel 23 with the driving shaft 22 the grinding wheel 17 is rotated, the gear 16 to the ground rotates also at every rotation of the grinding wheel through a division between two teeth. At the same time the grinding spindle 1 is reciprocating in the axial direction through such a distance that all the points of the grinding zone come into contact with all the points of the tooth face, in order to correct faults in the grinding wheel face and in order to ensure a uniform wearing of this grinding wheel face.

The grinding wheel might theoretically consist of a spiral $b$ of such length that it overlaps the engaging line, i. e. is longer than the engaging length $g$, $k$ of Fig. 4. As it is extraordinary difficult to produce such a long spiral sufficiently accurate and to maintain the same so, only one single spiral winding is really provided. This single winding might, if it cooperates with the gear to be ground, move only over a part amount of the involute to be ground. By the reciprocating movement of the carriage A this limited working zone of the grinding wheel is gradually moved over the entire tooth face.

In order to turn the grinding wheel 17 in accordance with the accurate pitch the spur wheel 23 is sifted to the right by means of the coupling fork 24, whereby the clutch cone 29 of said spur wheel is pressed into the clutch 31 on the carriage A and securely held in this position. The driving shaft 22 operates then only the screw spindle 52 through the intermediary of the tooth wheels 38, 40, 43 and 44 and of the differential gear 46, 47, 48, 50 and 51 which communicate then to the carriage A a reciprocating movement and at the same time rotate, through the differential change wheels 60, 61, 64 and through the differential gears 35, 36, 37 the grinding wheel slowly forwards and backwards. The spiral shaped grinding zone of the grinding wheel moves, at this occasion, along the turning diamond 97 which may be applied against the same by the carrier 96. In order to stop the machine the above described driving gear for the screw spindle 52 is interrupted by shifting the clutch 41 on the shaft 39 to the right (Fig. 3).

In the form of construction which has just been described the feeding of the tooth faces to be ground with regard to the tool is effected by an additional rotating movement of the spindle 15. For this additional rotation an axial displacement of the carriage A and consequently of the tool spindle 1 may be substituted. In Figs. 3$^a$ and 3$^b$ the modifications of the element which carries out the feeding are shown for this kind of application. A nut 54$^a$ is constructed like a sleeve, which rotates in a bearing 100 on the bed B. The feed shaft 85, the driving of which remains as before, rotates, through the intermediary of the worm wheel 101 keyed on its rear end by a key 101$^x$, and through the intermediary of a worm wheel 102 and of a worm 103 connected with the same, the teeth 104 on the spindle nut 54$^a$. The wheel 77 (Fig. 3$^a$) drives directly the vertical shaft 78.

At the reciprocating movement of the carriage the feed wheel 89 and consequently the worm wheel 86 and the shaft 85 are partly rotated at every reversing of the lever 91. This feeding movement is transmitted by the wheels 101, 102, 103 and 104 upon the threaded nut 54$^a$ by the rotation of which an axial shifting of the spindle 55 and consequently of the carriage A is produced.

I claim:—

1. A machine for accurately grinding the faces of the teeth of gears, comprising in combination with a bed, a carriage horizontally shiftable on said bed, a grinding spindle in said carriage, a grinding wheel on said spindle the line-shaped working edge of said grinding wheel having the shape of a cylindrical helical line the pitch of which is equal to the division of the base circle of the gear teeth, means for communicating to said spindle a continuous rotation, means for communicating to said carriage a reciprocating movement in longitudinal direction, means for imparting to said spindle selectively besides the continuous rotating movement an axial displacement and an additional rotating movement or, in stopping the continuous rotating movement, only an axial displacement and an additional rotating movement for the production of the spiral shaped movement of said grinding wheel, an upright shiftably mounted in said bed, a horizontal work carrying spindle in the head of said upright, means for adjusting said upright in vertical direction so that the grinding zone of said grinding wheel coincides with the base circle of said work, means for rotating said work of one tooth division, and means for communicating to said work spindle an additional rotating movement for applying the tooth face onto said grinding wheel so that all points of the grinding zone come into contact with all the points of the tooth face.

2. In a machine as claimed in claim 1 a grinding tool in the shape of a grinding wheel having a working edge practically line-shaped in the direction of movement and directed sidewards and representing mathematically a point in the plane of the gear and describing in the plane of the gear involute curves by being moved along a line touching the base circle when said gear is being rotated at the speed of the base circle.

3. A machine for accurately grinding the faces of the teeth of gears, comprising in combination with a bed, a carriage horizontally shiftable on said bed, a grinding spindle in said carriage, a grinding wheel on said spindle the line-shaped working edge of said grinding wheel having the shape of a cylindrical helical line the pitch of which is equal to the division of the base circle of the gear teeth, means for communicating to said spindle a continuous rotation, said means comprising a driving shaft journalled in said carriage parallel to said grinding spindle, a driving pulley on the rear end of said shaft on the outer side of said carriage, a differential shaft journalled in said carriage in alignment with the rear end of said grinding spindle, a toothed drum shiftably mounted on said shaft, conical clutch faces one at each end of said drum, a vertical hand operated coupling for the engaging with the inner end of said toothed drum, a clutch cone on said shaft, a clutch cone on said carriage said two clutch cones standing each opposite one of said conical clutch faces of said toothed drum, a hollow toothed wheel loosely mounted at the one end on the rear end of said grinding spindle and at the other end on said differential shaft, a bevel wheel keyed on the rear end of said grinding spindle and located in said hollow toothed wheel, a cross shaft in said hollow toothed wheel crossing the axes of said grinding spindle and of said differential shaft, two differential wheels one on each end of said cross shaft and meshing with said bevel wheel on said grinding shaft, a bevel wheel keyed on the inner end of said differential shaft and meshing with said two differential wheels, means for communicating to said carriage a reciprocating movement in longitudinal direction, means for imparting to said spindle selectively besides the continuous rotating movement an axial displacement and an additional rotating movement or, in stopping the continuous rotating movement, only an axial displacement and an additional rotating movement for the production of the spiral shaped movement of said grinding wheel, an upright shiftably mounted in said bed, a horizontal work carrying spindle in the head of said upright, means for adjusting said upright in vertical direction so that the grinding zone of said grinding wheel coincides with the base circle of said work, means for rotating said work of one tooth division, and means for communicating to said work spindle an additional rotating movement for applying the tooth face onto said grinding wheel so that all points of the grinding zone come into contact with all the points of the tooth face.

4. A machine for accurately grinding the faces of the teeth of gears, comprising in combination with a bed, a carriage horizontally shiftable on said bed a grinding spindle in said carriage, a grinding wheel on said spindle the line-shaped working edge of said grinding wheel having the shape of a cylindrical helical line the pitch of which is equal to the division of the base circle of the gear teeth, means for communicating to said spindle a continuous rotation, consisting of a driving shaft journalled in said carriage parallel to said grinding spindle, a driving pulley on the rear end of said shaft on the outer side of said carriage, a differential shaft journalled in said carriage in alignment with the rear end of said grinding spindle, a toothed drum shiftably mounted on said shaft, conical clutch faces one at each end of said drum, a vertical hand operated coupling for the engaging with the inner end of said toothed drum, a clutch cone on said shaft, a clutch cone on said carriage said two clutch cones standing each opposite one of said conical clutch faces of said toothed drum, a hollow toothed wheel loosely mounted at the one end on the rear end of said grinding spindle and at the other end on said differential shaft, a bevel wheel keyed on the rear end of said grinding spindle and located in said hollow toothed wheel, a cross shaft in said hollow toothed wheel crossing the axes of said grinding spindle and of said differential shaft, two differential wheels one on each end of said cross shaft and meshing with said bevel wheel on said grinding shaft, a bevel wheel keyed on the inner end of said differential shaft and meshing with said two differential wheels, means for communicating to said carriage a reciprocating movement in longitudinal direction, consisting of a nut fixed on said bed, a screw spindle journalled in said carriage and screwed into said nut, a spur wheel keyed on said driving shaft on the inner side of said toothed drum, a counter shaft journalled in said carriage between said grinding spindle and said screw spindle, a spur wheel loosely mounted on said counter shaft meshing with said spur wheel on said driving shaft, a clutch for coupling said spur wheel with said counter shaft, an intermediate shaft between said counter shaft and said screw spindle, a transmission gear coupling said counter shaft with said intermediate shaft, two toothed wheels keyed on said intermediate shaft, two toothed wheels loosely mounted on said screw spindle the one gearing directly with the inner one of said toothed wheels on said intermediate shaft, a loosely rotating intermediate gear wheel coupling said second loose wheel of said screw spindle with said second toothed wheel of said intermediate shaft, a clutch sleeve on said screw spindle between said two toothed wheels, a rod shiftably mounted in said carriage parallel to said screw spindle, a clutch fork on said rod, and engaging with said clutch sleeve, a prismatic back of said clutch fork, a spring controlled bolt acting upon said prismatic back for suddenly shifting said clutch fork to the right or left for reversing the direction of rotation of said screw spindle, means for imparting to said spindle selectively besides the continuous rotating movement an axial displacement and an additional rotating movement or, in stopping the continuous rotating movement, only an axial displacement and an additional rotating movement for the production of the spiral shaped movement of said grinding wheel, an upright shiftably mounted in said bed, a horizontal work carrying spindle in the head of said upright, means for adjusting said upright in vertical direction so that the grinding zone of said grinding wheel coincides with the base circle of said work, means for rotating said work of one tooth division, and means for communicating to said work spindle an additional rotating movement for applying the tooth face onto said grinding wheel so that all points of the grinding zone come into contact with all the points of the tooth face.

5. Apparatus for accurately grinding the faces of the teeth of gears including a grinding wheel formed with an edge which is practically line-shaped in the direction of the movement and directed sideways and which represents mathematically a point in the plane of the gear, and means for moving said edge of the grinding wheel at the speed of the base circle of the gear along a line tangent to the pitch circle so that this edge moves in the plane of the gear exclusively along involute curves.

6. Apparatus as claimed in claim 5, in which the line-shaped working edge of the wheel which is directed sidewards has the form of a cylindrical helical line, the pitch of which is equal to the division of the base circle, a spindle on which this grinding wheel is mounted, and means for communicating to said spindle selectively not only a continuous movement but also a shifting movement in axial direction and an additional movement for grinding the gear or, if said spindle stands still, only a shifting movement in axial direction and an additional rotating movement for producing the spiral shaped path of movement of said wheel.

In testimony whereof I affix my signature.

RICHARD HERRMANN.